United States Patent
Johnston et al.

(10) Patent No.: US 8,756,018 B2
(45) Date of Patent: Jun. 17, 2014

(54) METHOD FOR TIME LAPSED RESERVOIR MONITORING USING AZIMUTHALLY SENSITIVE RESISTIVITY MEASUREMENTS WHILE DRILLING

(75) Inventors: Lucian Johnston, Sugar Land, TX (US); Selim Djandji, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 519 days.

(21) Appl. No.: 12/821,303

(22) Filed: Jun. 23, 2010

(65) Prior Publication Data

US 2011/0320126 A1    Dec. 29, 2011

(51) Int. Cl.
| | |
|---|---|
| G01N 15/08 | (2006.01) |
| G01V 1/40 | (2006.01) |
| G01V 3/18 | (2006.01) |
| G01V 5/04 | (2006.01) |
| G01V 9/00 | (2006.01) |
| G01V 1/00 | (2006.01) |
| G01V 1/28 | (2006.01) |

(52) U.S. Cl.
USPC ............... 702/12; 702/7; 702/9; 702/16

(58) Field of Classification Search
CPC .......... E21B 1/00; E21B 47/022; E21B 47/04
USPC ................................ 702/12, 7, 9, 16
See application file for complete search history.

(56) References Cited

U.S. PATENT DOCUMENTS

| | | |
|---|---|---|
| 5,235,285 A | 8/1993 | Clark et al. |
| 5,517,464 A | 5/1996 | Lerner et al. |
| 5,767,680 A | 6/1998 | Torres-Verdin et al. |
| 5,886,255 A | 3/1999 | Aronstam |
| 6,739,165 B1 * | 5/2004 | Strack ............................. 702/13 |
| 7,040,415 B2 | 5/2006 | Boyle et al. |
| 7,382,135 B2 | 6/2008 | Li et al. |
| 2005/0140373 A1 * | 6/2005 | Li et al. .......................... 324/338 |
| 2008/0236270 A1 * | 10/2008 | Denichou et al. .......... 73/152.16 |

* cited by examiner

*Primary Examiner* — John Breene
*Assistant Examiner* — Manuel Rivera Vargas
(74) *Attorney, Agent, or Firm* — Kenneth Liu

(57) ABSTRACT

A method for determining movement of a fluid contact in a subsurface reservoir includes measuring azimuthally sensitive resistivity at a first time from within a wellbore penetrating the subsurface reservoir. A first position of the fluid contact with respect to the wellbore is determined using the azimuthally sensitive resistivity measurements. After a selected time, the measuring azimuthally sensitive resistivity from within a wellbore penetrating the subsurface reservoir is repeated. Movement of the fluid contact from the first position is determined using the repeated azimuthally sensitive resistivity measurements.

15 Claims, 4 Drawing Sheets

METHOD FOR TIME LAPSED RESERVOIR MONITORING USING AZIMUTHALLY SENSITIVE RESISTIVITY MEASUREMENTS WHILE DRILLING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to locating an interface between water and hydrocarbon in a subsurface reservoir from within a wellbore. More specifically, the invention relates to detecting changes over time of the interface relative to a wellbore using azimuthally sensitive electromagnetic measurements while drilling or tripping. These changes may be located in any direction relative to the borehole.

2. Background Art

Wellbores are drilled through subsurface rock formations for, among other purposes, making a conduit to enable flow of fluids such as oil and gas to the earth's surface from rock formations which contain such materials. It is frequently the case that oil and gas bearing formations have water bearing zones located below the oil and/or gas. In drilling wellbores through such formations, it is known in the art to drill wellbores directionally, that is, at inclined angles with respect to vertical, even horizontally, to expose as much of the oil and/or gas bearing portion of the formation to the wellbore. It is important when drilling such wellbores to maintain a selected vertical distance between the wellbore and the boundary of the water bearing portion of the formation. Maintaining such distance reduces the possibility of having the wellbore unintentionally penetrate the water bearing portion of the formation, thus reducing the oil and/or gas productive capacity of the wellbore.

U.S. Pat. No. 7,382,135 issued to Li et al. and assigned to the assignee of the present invention describes a method and apparatus for drilling a directional wellbore so as to determine a distance and direction between a wellbore and an electrical resistivity contrasting feature in subsurface formations. Frequently, water bearing formations have substantially different electrical resistivity than oil and/or gas bearing formations, and so the technique and apparatus disclosed in the Li et al. patent is known to be used to maintain wellbore trajectory during drilling so that a distance to a water boundary is maintained. Alternatively, the method and apparatus disclosed in the Li et al. patent may be used to determine distance to a water boundary along a wellbore during "tripping" or other movement of a pipe string in a wellbore.

It is also known in the art that as an oil and/or gas bearing formation located above a water boundary in the same formation has oil and/or gas withdrawn therefrom through one or more wellbores, the position of the water boundary may move upwardly toward the one or more wellbores. Such movement may not be uniform over the entire rock formation because of differences in production rates from each of the one or more wellbores, differences in fluid mobility within the formation and changes in relative permeability as a result of formation subsidence, among other causes. There is a need, therefore, for a technique to determine the position of water boundaries over time, so that subsequent wellbores may avoid being drilled too close to the water boundary, and to be able to adjust production rates and intervals in existing wellbores to optimize extraction of oil and/or gas from the rock formation.

SUMMARY OF THE INVENTION

A method for determining movement of a fluid contact in a subsurface reservoir according to one aspect of the invention includes measuring azimuthally sensitive resistivity at a first time from within a wellbore penetrating the subsurface reservoir. A first position of the fluid contact with respect to the wellbore is determined using the azimuthally sensitive resistivity measurements. After a selected time, the measuring azimuthally sensitive resistivity from within a wellbore penetrating the subsurface reservoir is repeated. Movement of the fluid contact from the first position is determined using the repeated azimuthally sensitive resistivity measurements.

A method for mapping a fluid contact in a subsurface reservoir according to another aspect of the invention includes drilling a plurality of wellbores through the subsurface reservoir. In each wellbore, azimuthally sensitive resistivity is measured. The measured azimuthally sensitive resistivity is used to determine a position of the fluid contact with respect to each wellbore. The determined positions with respect to each wellbore are used to generate a map of the fluid contact.

Other aspects and advantages of the invention will be apparent from the following description and the appended claims.

DETAILED DESCRIPTION

Figure 1:
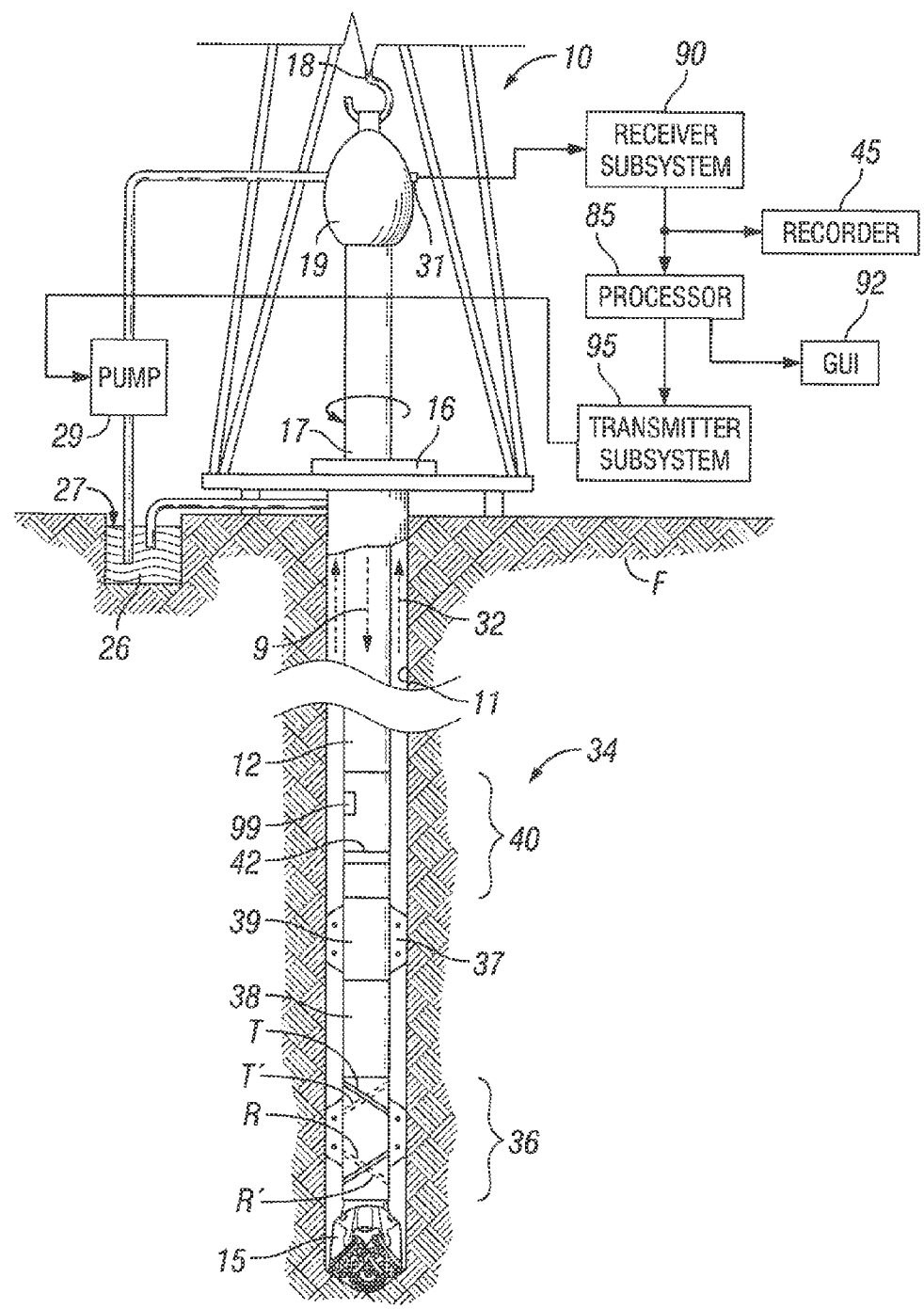
FIG. 1 shows an example logging while drilling apparatus that may be used in accordance with the invention.

FIG. 1 illustrates a drilling rig and drill string in which the present invention can be used. A land-based platform and derrick assembly 10 are positioned over a wellbore 11 penetrating a subsurface formation F. In the illustrated embodiment, the wellbore 11 is formed by rotary drilling in a manner that is well known. Those of ordinary skill in the art given the benefit of this disclosure will appreciate, however, that the present invention also finds application in directional drilling applications as well as rotary drilling, and is not limited to land-based rigs.

A drill string 12 is suspended within the wellbore 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (also not shown), through the kelly 17 and a rotary swivel 19 which permits rotation of the drill string relative to the hook.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 9. The drilling fluid exits the drill string 12 via ports in the drill bit 15, and then circulates upwardly through the region between the outside of the drill string and the wall of the wellbore, called the annulus, as indicated by the direction arrows 32. In this manner, the drilling fluid lubricates the drill bit 15 and carries formation cuttings up to the surface as it is returned to the pit 27 for recirculation.

The drill string 12 further includes a bottomhole assembly, generally referred to as 34, near the drill bit 15 (in other words, within several drill collar lengths from the drill bit). The bottomhole assembly includes capabilities for measuring, processing, and storing information, as well as communicating with the surface. The bottomhole assembly ("BHA") 34 thus includes, among other things, a measuring and local communications apparatus 36 for determining and communicating the resistivity of the formation F surrounding the wellbore 11. The communications apparatus 36, which includes an azimuthally sensitive resistivity measuring instrument, includes a first pair of transmitting/receiving antennas T, R, as well as a second pair of transmitting/receiving antennas T", R". The second pair of antennas T", R" is symmetric with respect to the first pair of antennas T, R. The resistivity instrument 36 further includes a controller to control the acquisition of data, as is known in the art. The resistivity instrument may be one described more fully in U.S. Pat. No. 7,382,135 issued to Li et al. and assigned to the assignee of the present invention. The foregoing instrument is used to provide services under the marks PERISCOPE 15 and PERISCOPE 100, which are service marks of the assignee of the present invention.

The BHA 34 further includes instruments housed within drill collars 38, 39 for performing various other measurement functions, such as measurement of the natural radiation, density (gamma ray or neutron), and pore pressure of the formation F. At least some of the drill collars are equipped with stabilizers 37, as are well known in the art.

A surface/local communications subassembly 40 is also included in the BHA 34, just above the drill collar 39. The subassembly 40 includes a toroidal antenna 42 used for local communication with the resistivity tool 36 (although other known local-communication means may be employed to advantage), and a known type of acoustic telemetry system that communicates with a similar system (not shown) at the earth's surface via signals carried in the drilling fluid or mud. Thus, the telemetry system in the subassembly 40 includes an acoustic transmitter that generates an acoustic signal in the drilling fluid (a.k.a., "mud-pulse") that is representative of measured downhole parameters. Such telemetry, and related telemetry techniques that impart acoustic signals in the drilling fluid may be generally characterized as modulating the flow of fluid in the drill string or pipe string.

The generated acoustical signal is received at the surface by transducers represented by reference numeral 31. The transducers, for example, piezoelectric transducers, convert the received acoustical signals to electronic signals. The output of the transducers 31 is coupled to an uphole receiving subsystem 90, which demodulates the transmitted signals. The output of the receiving subsystem 90 is then coupled to a computer processor 85 and a recorder 45. The processor 85 may be used to determine the formation resistivity profile (among other things) on a "real time" basis while logging or subsequently by accessing the recorded data from the recorder 45. The computer processor is coupled to a monitor 92 that employs a graphical user interface ("GUI") through which the measured downhole parameters and particular results derived therefrom (e.g., resistivity profiles) are graphically presented to a user.

An uphole transmitting system 95 is also provided for receiving input commands from the user (e.g., via the GUI in monitor 92), and is operative to selectively interrupt the operation of the pump 29 in a manner that is detectable by transducers 99 in the subassembly 40. In this manner, there is two-way communication between the subassembly 40 and the uphole equipment. A suitable subassembly 40 is described in greater detail in U.S. Pat. Nos. 5,235,285 and 5,517,464, both of which are assigned to the assignee of the present invention. Those skilled in the art will appreciate that alternative acoustic techniques, as well as other telemetry means (e.g., electromechanical, electromagnetic), can be employed for communication with the surface.

Figure 1A:
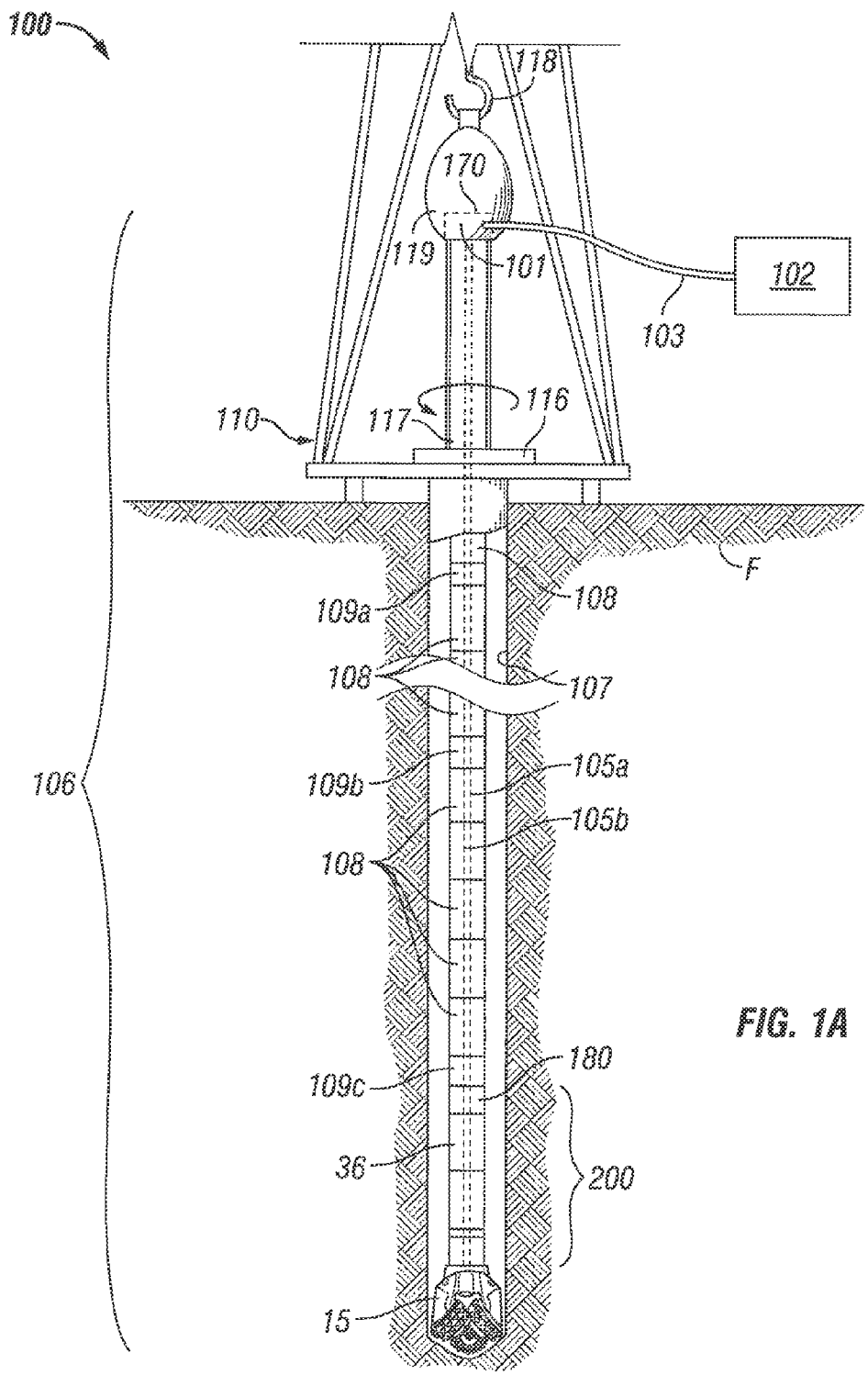
FIG. 1A shows the apparatus of FIG. 1 using a wired pipe string for signal telemetry to the surface from the logging while drilling apparatus.

In one example of such alternative signal telemetry, the drill string 12 may be substituted by a "wired" pipe string, which includes a wired signal telemetry channel forming part of each pipe segment, and an electromagnetic coupler disposed on a thread shoulder at each longitudinal end of each pipe segment. See, for example, U.S. Pat. No. 7,040,415 issued to Boyle et al. and assigned to the assignee of the present invention. Referring to FIG. 1A, an example of such telemetry system may include the following. The drill string 106 that employs a telemetry system 100 in accordance with the present example includes a plurality of interconnected tubular members (described further below) suspended from a derrick and platform assembly 110 by way of a traveling block (not shown) and a hook 118. The upper end of the drill string 106 is defined by a kelly joint 117, the uppermost tubular member in the string, which is engaged by a conventional torque-applying means including a rotary table 116 for rotating the kelly joint as well as the entire drill string 106. A swivel 119 connects the hook 118 to the kelly joint 117, and permits rotation of the kelly joint and the drill string 106 relative to the hook.

The lower end of the drill string 106 may include a drill bit 15 which drills through the formation F to create the wellbore 107 as explained above. The drill bit is connected for rotation with the drill string 106 in a rotary drilling configuration of the sort described above.

The drill string 106 as explained above may otherwise employ a "top-drive" configuration wherein a power swivel rotates the drill string instead of a kelly joint and rotary table. Those skilled in the art will also appreciate that "sliding" drilling operations may otherwise be conducted with the use of a well known Moineau-type mud motor that converts hydraulic energy from the drilling mud pumped from a mud pit down through the drill string 106 into torque for rotating a drill bit. Drilling may furthermore be conducted with so-called "rotary-steerable" systems which are known in the related art. The various aspects of the present invention are adapted to each of these configurations and are not limited to conventional rotary drilling operations, although such equipment and methods will be described herein for illustrative purposes. The drill string telemetry system 100 can include a cabled communication link 105*b* having at least two spaced apart adapter subs (e.g., 109*a*, 109*b*, 109*c*) within the drill string 106 and a cable 112 connecting the two adapter subs 109*a*, 109*b* for communication of a signal therebetween. The cabled communication link 105*b* can include a communicative coupler permitting the adapter subs to also serve as a component in a piped communication link 105a. Measurements from the well logging instrument 34 may be communicated to the surface unit 102 (including a recording unit 45) over the signal channel in the drill string 106 using a cable 103 connected to the swivel 119. The foregoing example, just as the example explained with reference to FIG. 1 is only intended to illustrate the principle of communication between the BHA 34 (including the well logging instrument 36 shown in FIG. 1) and the recording unit 45 and is not intended to limit the scope of telemetry devices that may be used in accordance with the invention.

Figure 2:
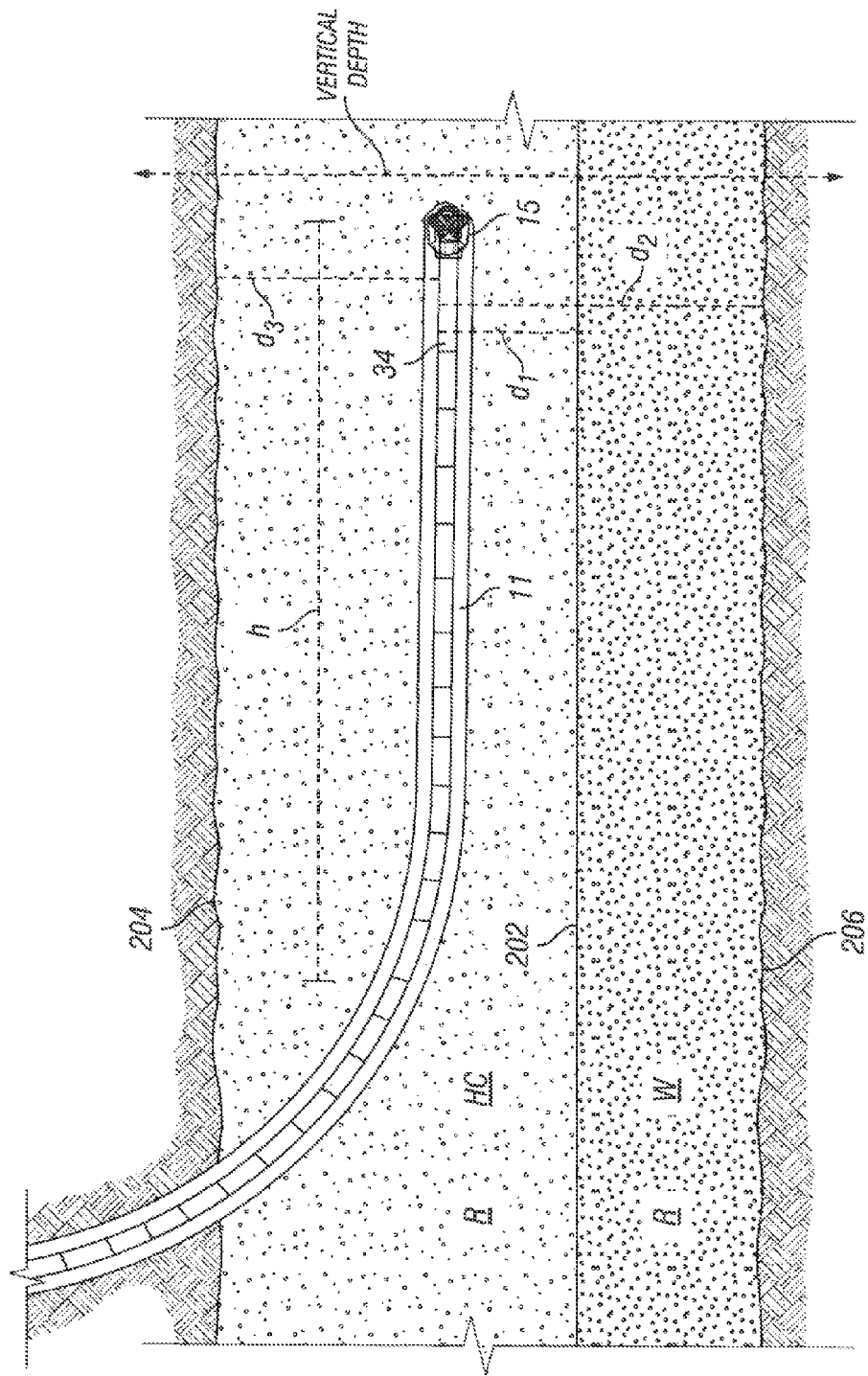
FIG. 2 shows an example of drilling a wellbore to maintain a selected distance between the wellbore and the boundary (contact) of a water bearing portion of a reservoir formation.
Figure 3:
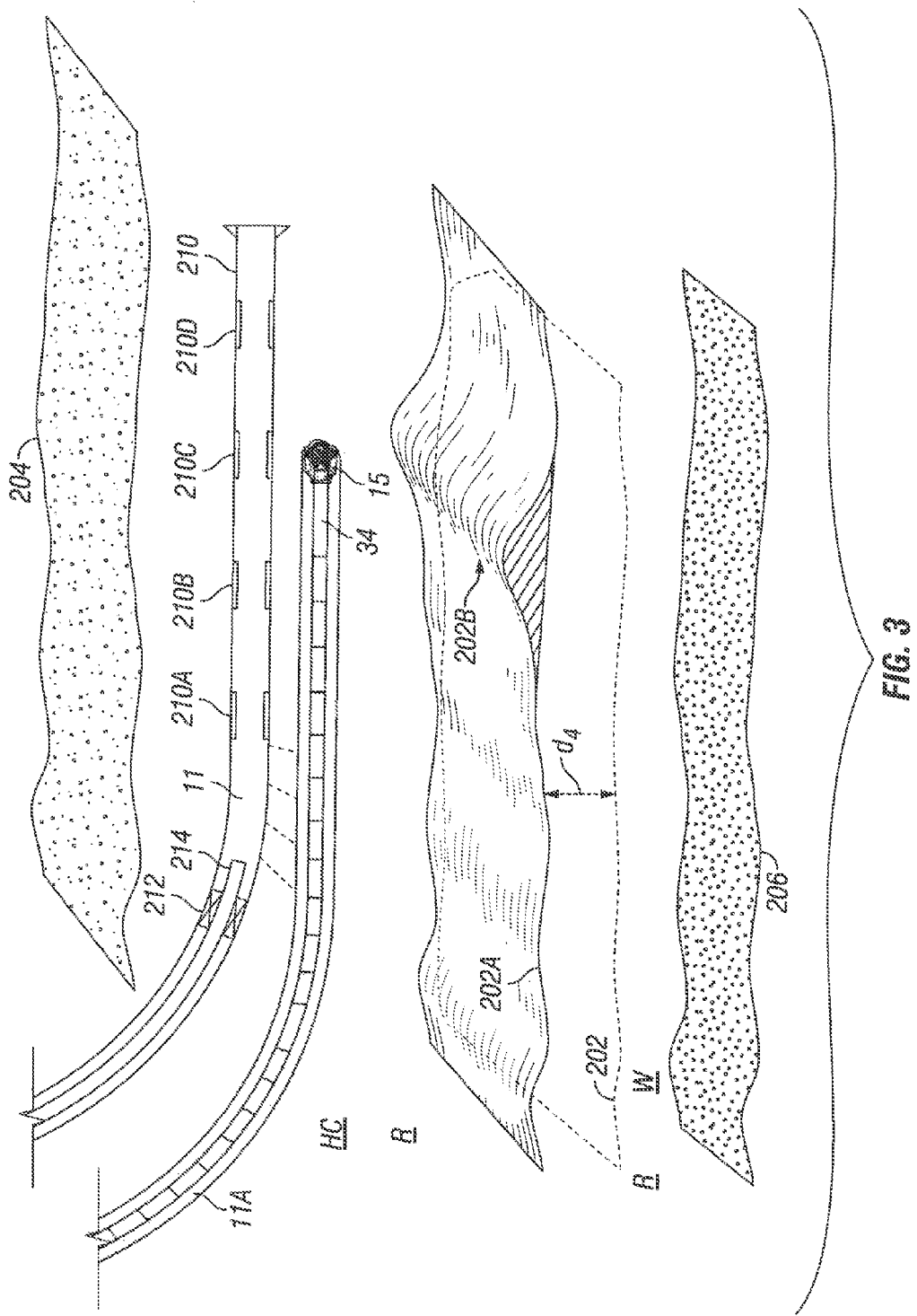
FIG. 3 shows an example of drilling a second wellbore after drilling the wellbore in FIG. 2; or after an existing wellbore has been produced for a selected time, and determining changes in the spatial distribution of the water contact after the selected time.

FIG. 2 shows drilling the wellbore 11 using the drill string described, for example, with reference to either FIG. 1 or FIG. 1A through an oil and/or gar bearing (reservoir) formation R. In the present example, the selected wellbore trajectory includes a substantially horizontal or highly inclined segment h to increase the length of wellbore exposed to the hydrocarbon (gas and/or oil) bearing portion HC of the reservoir formation R, while maintaining a selected vertical distance $d_1$ between the wellbore 11 and the boundary (contact) 202 between the hydrocarbon bearing portion HC and the contact 202. If the wellbore 11 is drilled too close to the contact 202, or penetrates the contact 202 into the water bearing portion W of the reservoir R, portions of the wellbore 11 may be unusable, thus decreasing hydrocarbon production capacity of the wellbore 11. The instrument (36 in FIG. 1) as explained with reference to FIG. 1, and as more fully set forth in U.S. Patent No. 7,382,135 issued to Li et al. may be used to determine the vertical distance $d_1$ as well as a distance $d_2$ between the wellbore 11 and the lower boundary of the reservoir formation R in contact with a substratum 206. Similarly, a distance $d_3$ between the wellbore and a superstratum 206 above the reservoir R. By determining the foregoing distances during wellbore drilling, not only can the wellbore 11 be maintained along a selected trajectory with respect to the contact 202 and the strata boundaries above and below the reservoir R, as will be explained with reference to FIG. 3, changes in the position of the boundary 202 with respect to time may be determined by repeating the well logging operation in the wellbore 11 at selected times or from within other wellbores (FIG. 3). It will be appreciated by those skilled in the art that the distances $d_1$, $d_2$ and $d_3$ may be determined at each longitudinal position along the wellbore 11 during drilling or during movement of the drill string after the drilling is completed.

Referring to FIG. 3, an example of repeating the making of azimuthally sensitive resistivity measurements in a wellbore after a selected time will be explained. FIG. 3 shows an oblique, 3 dimensional view of the formations and zones shown in cross section in FIG. 2 to better illustrate the principle of the invention. A second wellbore 11A may be drilled within the reservoir formation R at a selected lateral distance from a first wellbore 11. The first wellbore 11 may be the wellbore drilled as explained with reference to FIG. 2, or alternatively, the second wellbore 11A may be the wellbore being drilled as explained with reference to FIG. 2. In either case, the first wellbore 11 is shown as being completed with a pipe or casing 210 therein. The completed wellbore may also include a velocity string (production tubing) 214 sealed within the casing 210 using annular seal such as a packer 212. In the present example, the casing 210 in the first wellbore 11 may include production control devices such as sliding sleeves 210A, 210B, 210C, 210D that may restrict or close portions of the first wellbore 11 to entry of fluid from the hydrocarbon bearing portion HC of the reservoir formation R.

The second wellbore 11A may have drilling operations underway. The well logging instrument (36 in FIG. 1) in the BHA 34 may be used during such drilling operations to make azimuthally sensitive measurements of electrical resistivity as explained above. Such measurements may, as in the example shown in FIG. 2, be used to determine vertical distances between the second wellbore 11A and the overlying formation (superstratum 204), underlying formation (substratum 206) and the water contact in the reservoir. In FIG. 3, the position of the water contact 202 determined at the time the first wellbore was drilled is shown as dashed lines. The position of the water contact at the time of drilling the second wellbore 11A is shown as solid lines 202A. During the time between drilling the first wellbore 11 and the second wellbore 11A, hydrocarbons have been extracted from the hydrocarbon bearing zone HC through the first wellbore 11. In the present example, in which the reservoir may have an active water drive, the position of the water contact 202A has moved a certain vertical distance $d_4$ toward the wellbores 11, 11A as a result of such extraction. Using the azimuthally sensitive measurements made by the instrument in the BHA, it is possible to determine the foregoing movement distance $d_4$. What may also be observed in FIG. 3 is a zone in the reservoir R that may have higher fluid mobility than other portions of the reservoir R. In such higher mobility portions, shown schematically at 202B, the water contact 202A may move a greater distance toward the wellbores 11, 11A than in other portions of the reservoir. Such effect is known in the art as "coning" and if allowed to continue may result in water "breakthrough" such that the water contact 202A moves above the vertical depth of one or more wellbores (e.g., 11, 11A) penetrating the reservoir R. In such cases, the portions of the wellbores then proximate or below the moved water contact may become unusable, or the entering water may reduce overall productivity of the particular wellbores.

In the present example, determination of movement of the water contact 202A, and in particular determining the existence of coning 202B may be used to perform either or both of changing the trajectory of the wellbore being drilled (e.g., second wellbore 11A) and operating a completion control (e.g., one or more of sliding sleeves 210A, 210B, 210C, 210D to restrict or stop flow of fluid into portions of a wellbore subject to water breakthrough. By restricting or stopping the flow in such circumstances, the productive capacity of the wellbore may be maintained and extraction efficiency and/or ultimate recovery from the hydrocarbon bearing zone HC may be improved.

The foregoing technique may be repeated at other selected times and from within any number of while drilling wellbores penetrating the reservoir R to monitor movement of the fluid contact 202, 202A with respect to time. In some examples, a plurality of wellbores may be drilled through the reservoir R prior to any substantial production of fluid therefrom. The azimuthally sensitive measurements made in each of such wellbores may be used to determine a three dimensional distribution of the water contact 202.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining movement of a fluid contact in a subsurface reservoir, comprising:
   measuring downhole, azimuthally sensitive resistivity at a first time from within a wellbore penetrating the subsurface reservoir;

determining a first position of the fluid contact with respect to the wellbore using only the downhole, azimuthally sensitive resistivity measurements as measured input parameters;

repeating, after a selected time, the measuring downhole, azimuthally sensitive resistivity from within a wellbore penetrating the subsurface reservoir; and determining movement of the fluid contact from the first position using only the repeated downhole, azimuthally sensitive resistivity measurements as measured input parameters and the first position as a determined input parameter.

2. The method of claim 1, wherein the repeating measuring downhole, azimuthally sensitive resistivity measurements after the selected time is performed in a wellbore different from the measuring downhole, azimuthally sensitive measurements made at the first time.

3. The method of claim 2 further comprising adjusting a trajectory of the different wellbore to maintain a selected distance of the different wellbore from the fluid contact.

4. The method of claim 1 further comprising operating a completion control in at least one wellbore penetrating the subsurface formation in response to the determined movement of the fluid contact.

5. The method of claim 4 wherein the at least one completion control comprises a sliding sleeve.

6. The method of claim 1 further comprising determining movement of the fluid contact caused by differential fluid mobility within different portions of the subsurface reservoir.

7. The method of claim 1, wherein the measuring downhole, azimuthally sensitive resistivity at the first time comprises measuring during the drilling of the wellbore.

8. The method of claim 1, further comprising:

measuring downhole, azimuthally sensitive resistivity in a plurality of additional wellbores drilled through the subsurface reservoir;

determining a position of the fluid contact from the resistivity measurements made in each additional wellbore; and generating a three dimensional map of the fluid contact from the determined positions in each of the additional wellbores.

9. The method of claim 1, wherein signals corresponding to the downhole, azimuthally sensitive resistivity measurements are transmitted from the wellbore to a recording unit at the surface by modulating flow of fluid through a pipe string.

10. The method of claim 1, wherein signals corresponding to the downhole, azimuthally sensitive resistivity measurements are transmitted from the wellbore to a recording unit at the surface using a wired communication channel in a pipe string.

11. A method for mapping a fluid contact in a subsurface reservoir, comprising:

drilling a plurality of wellbores through the subsurface reservoir;

in each wellbore, measuring downhole, azimuthally sensitive resistivity;

using only the measured downhole, azimuthally sensitive resistivity as input parameters to determine a position of the fluid contact with respect to each wellbore;

repeating the measuring downhole, azimuthally sensitive resistivity after a selected time in at least one of the plurality of wellbores; and using the determined positions with respect to each wellbore and the repeated downhole, azimuthally sensitive resistivity measurements to generate a map of the fluid contact.

12. The method of claim 11 further comprising: measuring downhole, azimuthally sensitive resistivity after the selected time in an additional wellbore; and determining movement of the fluid contact with respect to the one of the plurality of wellbores and the additional wellbore.

13. The method of claim 12 wherein the selected time follows removal of fluid from the subsurface reservoir.

14. The method of claim 11, wherein signals corresponding to the downhole, azimuthally sensitive resistivity measurements are transmitted from the wellbore to a recording unit at the surface by modulating flow of fluid through a pipe string.

15. The method of claim 11, wherein signals corresponding to the downhole, azimuthally sensitive resistivity measurements are transmitted from the wellbore to a recording unit at the surface using a wired communication channel in a pipe string.

* * * * *